United States Patent
McLaughlin

(10) Patent No.: US 6,480,601 B1
(45) Date of Patent: Nov. 12, 2002

(54) VOICE AND DATA TRANSFER FROM OUTBOUND DIALING TO INBOUND ACD QUEUE

(75) Inventor: Michael McLaughlin, Merrimack, NH (US)

(73) Assignee: Concerto Software, Inc., Westford, MA (US)

( * ) Notice: Subject to any disclaimer, the term of this patent is extended or adjusted under 35 U.S.C. 154(b) by 0 days.

(21) Appl. No.: 09/438,445

(22) Filed: Nov. 12, 1999

(51) Int. Cl.[7] .......................... H04M 3/523; H04M 3/58
(52) U.S. Cl. .............................. 379/265.11; 379/212.01; 379/266.07; 379/266.1
(58) Field of Search ...................... 379/212.01, 265.01, 379/265.02, 265.11, 265.13, 266.01, 266.07, 266.1

(56) References Cited

U.S. PATENT DOCUMENTS

| | | | | |
|---|---|---|---|---|
| 5,467,391 A | * | 11/1995 | Donaghue et al. | 379/265.06 |
| 5,761,285 A | * | 6/1998 | Stent | 379/114.01 |
| 6,324,263 B1 | * | 11/2001 | Sherwood et al. | 379/242 |

* cited by examiner

*Primary Examiner*—Harry S. Hong
(74) *Attorney, Agent, or Firm*—Bourque & Associates, P.A.

(57) ABSTRACT

A system and method for transferring voice and data from an outbound call platform to an inbound call platform. The outbound and inbound call platforms are separate hardware platforms connected to a controlling device using computer telephone integration (CTI) links and connected together using one or more communication paths, such as trunks or T1 lines. If an outbound agent connected to the outbound call platform determines that an outbound call should be handled by an inbound agent connected to the inbound call platform, the outbound agent can request a transfer of that outbound telephone call. The outbound dialer then transfers the voice portion of the outbound telephone call to a predetermined extension on the inbound platform, and the inbound platform assigns a call ID to the transferred outbound call. The transferred outbound call is assigned to the appropriate ACD queue until an inbound agent is available to handle the call. When the voice portion of the call arrives at the headset of the available inbound agent, the call ID is used to correlate the data portion pertaining to the called party with the voice portion, thereby eliminating the need for the inbound agent to request data and manually enter data pertaining to the outbound telephone call.

12 Claims, 2 Drawing Sheets

VOICE AND DATA TRANSFER FROM OUTBOUND DIALING TO INBOUND ACD QUEUE

FIELD OF THE INVENTION

The present invention relates to call centers and more particularly, to a method and system for transferring telephone calls from an outbound call platform to an inbound call platform.

BACKGROUND OF THE INVENTION

A growing number of companies have begun using call centers (or contact centers) to handle interactions between customers and potential customers by way of telephone and/or the internet. Companies typically use call centers to provide inbound services, for example, to handle queries from customers to customer service representatives (CSRs), and/or outbound services, for example, to manage outbound telephone calls to potential customers for telemarketing or to existing customers for collections.

Many call centers use one hardware platform for performing outbound dialing and another hardware platform for inbound call processing. The outbound platform typically includes a predictive dialer for automatically dialing the customers or potential customers. The inbound call platform typically includes an automatic call distributor (ACD) that performs the inbound call processing. Different groups of agents are connected to the outbound platform and the inbound platform for handling the outbound calls and inbound calls respectively.

Although two separate hardware platforms may be used for inbound and outbound telephone calls in a call center, a customer contacted by the outbound call platform may want to speak with an agent connected to the inbound call platform. For example, a customer may be called for not making a payment, and that customer may state that the reason is because the product is not working. In this case, the outbound agent would want to transfer the customer to an inbound agent handling customer service and support.

In the existing systems, the voice of the customer is transferred from the outbound platform to an appropriate agent connected to the inbound call platform. The inbound agent must then ask the customer for the account information and must manually input this data in order to obtain additional data pertaining to the customer's account. This process is inconvenient for the customer and requires extra work from the agent.

Accordingly, a need exists for a method and system of transferring voice and data from an outbound call platform to a separate inbound call hardware platform automatically without requiring the agent to request information and input information manually.

SUMMARY OF THE INVENTION

The present invention features a method of transferring voice and data from an outbound call platform to an inbound call platform. The outbound call platform includes a dialer and a plurality of outbound agent workstations. The inbound call platform includes a plurality of inbound agent workstations.

According to the method of the present invention, at least one outbound telephone call is placed to a called party using the dialer in the outbound call platform. The outbound telephone call is then connected to an available outbound agent at one of the outbound agent workstations. When the available outbound agent determines that the called party needs to be handled by an inbound agent connected to the inbound call platform, the outbound telephone call is transferred to a reserved extension on the inbound call platform. A call identifier is then assigned to the outbound telephone call when the outbound telephone call arrives at the reserved extension on the inbound call platform. The outbound telephone call is then connected to an available inbound agent at one of the inbound agent workstations in the inbound call platform. The called party data is correlated to the outbound telephone call using the call identifier and is transferred to the inbound agent workstation.

The inbound call platform and outbound call platform are preferably connected using at least one communication path. The step of transferring the outbound telephone call to the extension on the inbound call platform further comprises the steps of initiating a call on the communication path to the predetermined extension, and connecting the outbound telephone call to the communication path.

According to one method, the outbound telephone call is transferred to an ACD queue before connecting the outbound telephone call to the available inbound agent.

The present invention also features a call center comprising an outbound call platform for placing outbound telephone calls, an inbound call platform for handling inbound telephone calls, a controlling device, at least one communication path between the inbound and outbound call platforms, and a controlling device coupled to the outbound call platform and the inbound call platform using CTI links. The outbound call platform includes a dialer for placing outbound telephone calls to called parties and a plurality of outbound agent workstations, linked to the dialer, for use by a plurality of outbound agents. The dialer connects the outbound telephone calls to available outbound agents at the outbound agent workstations. The inbound call platform includes an automatic call distributor (ACD) handling inbound telephone calls, and a plurality of inbound agent workstations, linked to the ACD, for use by a plurality of inbound agents. The inbound telephone calls are connected to available inbound agents at the inbound agent workstations.

The controlling device instructs the outbound call platform to initiate a call on the communication path to a reserved extension on the inbound call platform and instructs the outbound call platform to connect one of said outbound telephone calls to the communication path such that a called party on one of the outbound telephone calls is transferred to one of the inbound agents. The controlling device correlates called party data pertaining to the called party with the outbound telephone call transferred to the inbound agent.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
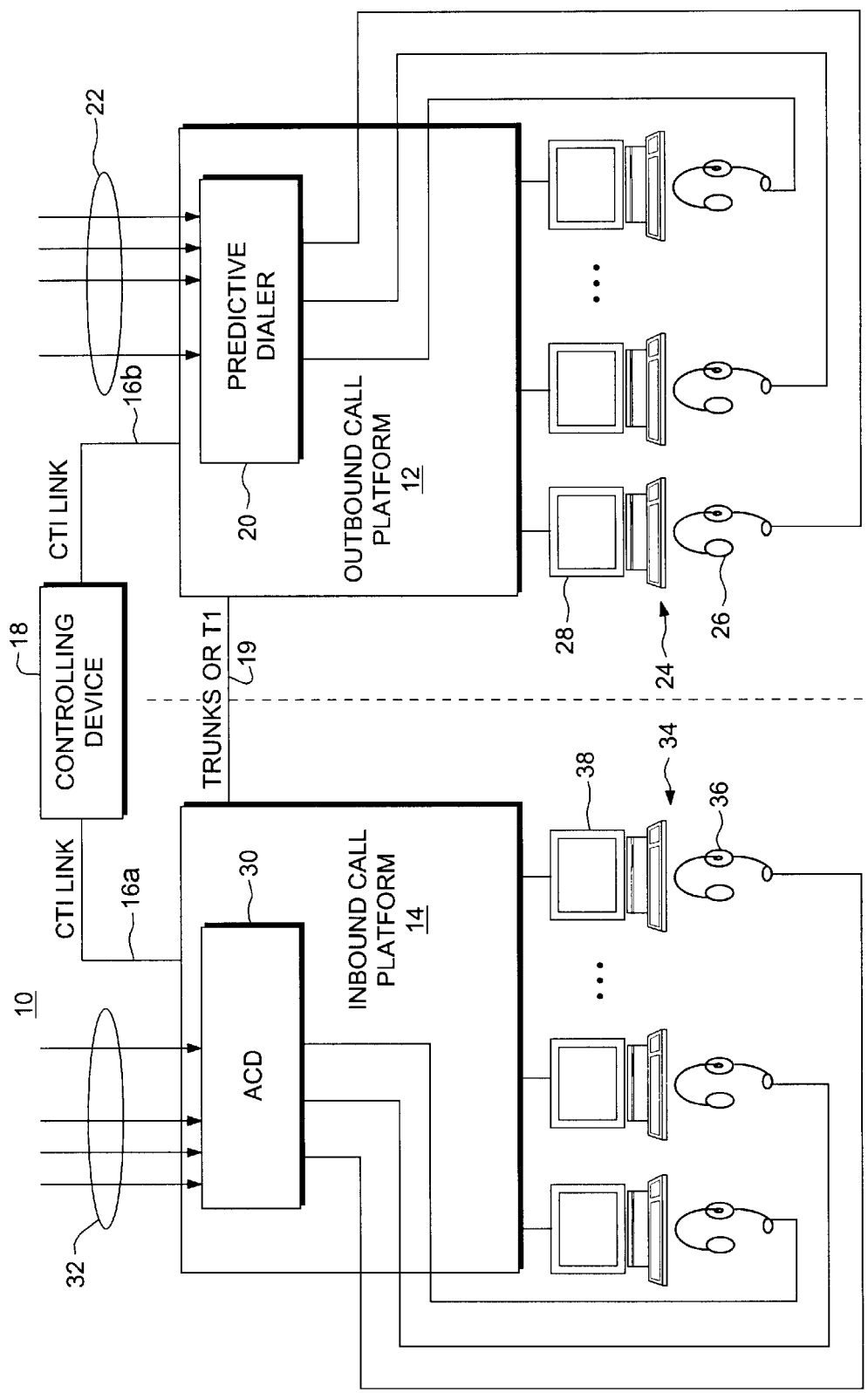
FIG. 1 is a schematic block diagram of a call center having separate outbound and inbound hardware platforms, according to the present invention.

A call center 10, FIG. 1, according to the present invention, includes a separate outbound call platform 12 and inbound call platform 14. Both the outbound call platform 12 and the inbound call platform 14 are coupled to a controlling device 18 by way of computer telephony integration (CTI) links 16a, 16b. A CTI link is a communication channel that the controlling device 18 can use to initiate telephony functions, such as "make call" and "transfer call," as well as to return status messages regarding calls or devices. Using the CTI links 16a, 16b and controlling device 18, outbound telephone calls placed by the outbound call platform 12 can automatically be transferred to the inbound call platform 14, as will be described in greater detail below. The outbound and inbound call platforms 12, 14 are also directly connected together using one or more communication paths 19, for example, trunks or T1 lines.

The outbound call platform 12 typically includes a predictive dialer 20 connected to a plurality of outbound lines or trunks 22. A plurality of outbound agent workstations 24 each include a audio communication device or headset 26 for use by the outbound agents to communicate with called parties and a data terminal 28 for use by outbound agents to view and enter data pertaining to the called parties. The outbound call platform 12 also includes hardware/software commonly used in conventional call centers to manage and control outbound calling.

The inbound call platform 14 typically includes an automatic call distributor (ACD) 30 coupled to inbound telephone lines or trunks 32. A plurality of inbound agent workstations 34 each include an audio communication device or headset 36 for allowing the inbound agents to communicate with calling parties, and a data terminal 38 for allowing inbound agents to view and/or enter data pertaining to the calling parties. The inbound call platform 14 also includes hardware and software commonly used in call centers to manage and control the handling of inbound telephone calls.

One example of a call center in which the present invention can be implemented is described in greater detail in U.S. Pat. No. 5,592,543, incorporated herein by reference.

Figure 2:
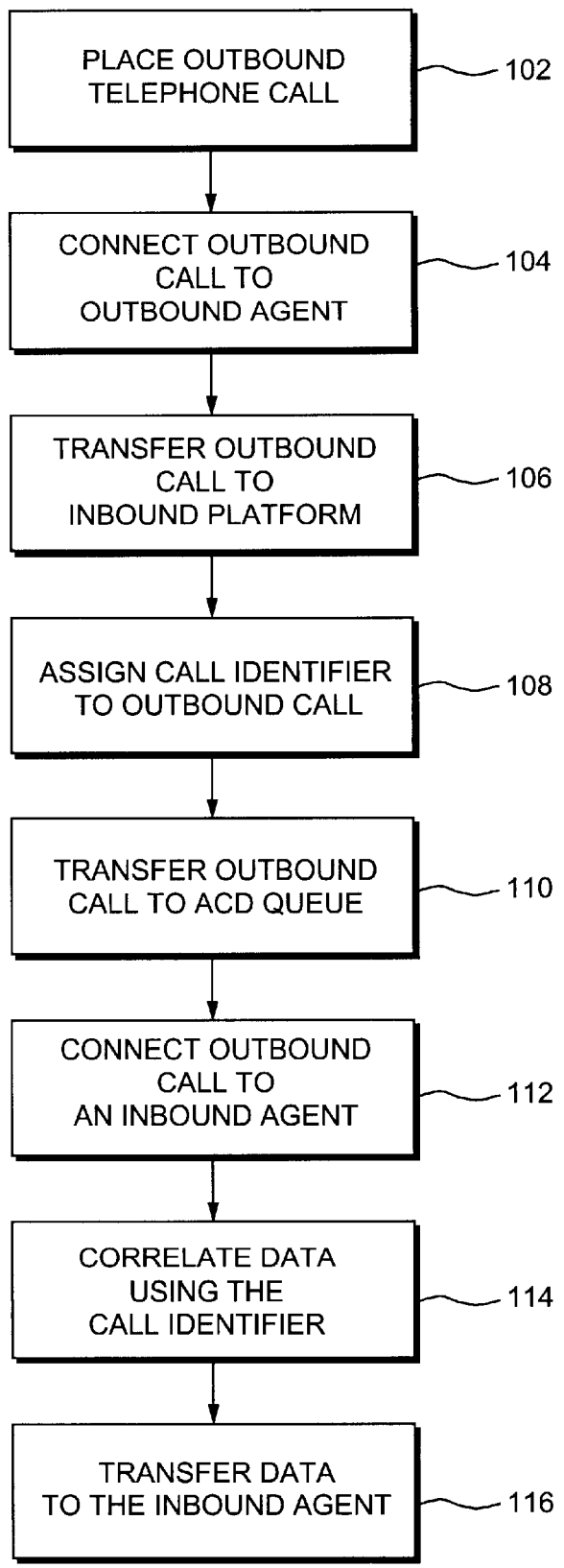
FIG. 2 is a flow chart illustrating a method of transferring voice and data from the outbound call platform to the separate inbound call platform, according to the present invention.

According to the method of the present invention, an outbound telephone call is placed by the outbound call platform 12, step 102, FIG. 2. The outbound call platform 12 preferably obtains a list of parties to be called, often referred to as a call campaign, and sends the telephone numbers associated with those parties to the dialer 20. The dialer 20 automatically dials the telephone numbers, for example, using call pacing algorithms to determine the number of calls to be placed based upon the current status of the resources in the call center 10.

The dialer 20 also monitors the calls being placed to determine if a call has been answered. If and when a call is answered, the outbound call is connected to an available outbound agent at one of the outbound agent workstations 24, step 104. The outbound call platform 12 connects the voice of the called party to the headset 26 at the appropriate agent workstation 24 of the available outbound agent. The outbound call platform 12 will simultaneously send any data pertaining to the called party to the data terminal 28 at the outbound agent workstation 24 of the available agent.

If the available outbound agent determines that the called party should be handled by one of the inbound agents, the available outbound agent can request a transfer and the outbound telephone call will be transferred to the inbound call platform 14, step 106. The outbound platform 12 preferably transfers the voice of the outbound telephone call to a reserved extension on the inbound platform 14. According to one example, the controlling device 18 instructs the outbound platform 12 to initiate a call on one of the trunks or T1 lines 19 connecting the outbound platform 12 to the inbound platform 14. This call is placed to the reserved extension on the inbound platform 14. After the call has been initiated, the controlling device 18 instructs the outbound platform 12 to connect the called party to the trunk/T1 line 19 used to initiate the call.

When the outbound telephone call arrives at the reserved extension, the inbound call platform 14 assigns a call identification number or call ID to the transferred outbound call, step 108. The call ID is assigned by the software on the inbound platform 14 and is passed to the controlling device 18 over the CTI link 16a.

The transferred outbound call is then transferred to a call handling queue on the inbound call platform 14, step 110, for example, corresponding to the issue that needs to be addressed by the called party. More specifically, after the inbound platform 14 informs the controlling device 18 of the call ID assigned to the call, the controlling device 18 instructs the inbound platform 14 to transfer the call to the appropriate call handling or ACD queue. For example, if the called party indicates that payment has not been made because the product is not working, the transferred outbound call will be transferred to an inbound platform queue corresponding to technical support.

When an inbound agent at one of the inbound agent workstations 34 becomes available, the transferred outbound call will be connected to the available inbound agent assigned to that call handling queue, step 112. Alternatively, if an inbound agent is available at the time the outbound call is transferred to the inbound call platform 14, the transferred outbound call may be connected to the available inbound agent immediately and may not need to be transferred to a call handling queue.

When the transferred outbound call is connected to the available inbound agent, the voice is connected to the headset 36 at the appropriate inbound agent workstation 34 of the available inbound agent. At approximately the same time, the call ID assigned to the outbound call is used by the controlling device 18 to correlate the data pertaining to the called party with the voice of the called party, step 114, and this data is transferred to the data terminal 38 at the inbound agent workstation 34 of the available inbound agent, step 116.

Accordingly, the method and system of the present invention allows a call center using separate hardware platforms for inbound and outbound calls to transfer voice and data from an outbound call platform to an inbound call platform without requiring the inbound agent to manually enter data. Any call center that uses separate hardware for inbound and outbound telephone calls could implement this system and method.

Modifications and substitutions by one of ordinary skill in the art are considered to be within the scope of the present invention which is not to be limited except by the claims which follow.

What is claimed is:

1. A method of transferring voice and data from an outbound call platform to an inbound call platform, said outbound call platform including a dialer and a plurality of outbound agent workstations, and said inbound call platform including an inbound call distributor and a plurality of inbound agent workstations coupled to said inbound call distributor, said method comprising:

placing at least one outbound telephone call to a called party using said dialer in said outbound call platform;

connecting said outbound telephone call to an available outbound agent at one of said outbound agent workstations;

determining, by said available outbound agent, that said called party needs to be connected to an inbound agent coupled to said inbound call platform;

transferring said outbound telephone call to a predetermined extension on said inbound call platform;

assigning a call identifier to said outbound telephone call when said outbound telephone call arrives at said predetermined extension on said inbound call platform;

connecting said outbound telephone call to an available inbound agent at one of said inbound agent workstations coupled to said inbound call platform;

correlating called party data to said outbound telephone call using said call identifier; and transferring said called party data to said one of said inbound agent workstations.

2. The method of claim 1 wherein said inbound call platform and said outbound call platform are connected using at least one communication path, and wherein the step of transferring said outbound telephone call to a predetermined extension on said inbound call platform comprises:

initiating a call on said at least one communication path to said predetermined extension on said inbound call platform; and connecting said outbound telephone call to said at least one communication path.

3. The method of claim 1 further including transferring said outbound telephone call to a call handling queue before connecting said outbound telephone call to said available inbound agent.

4. The method of claim 1 wherein the step of transferring said outbound telephone call to said predetermined extension on said inbound call platform is initiated by a controlling device connected to said inbound call platform and said outbound call platform by way of computer telephony integration (CTI) links.

5. The method of claim 1 wherein the step of correlating called party data is performed by a controlling device connected to said inbound call platform and said outbound call platform by way of computer telephony integration (CTI) links.

6. A system for transferring voice and data from an outbound call platform to an inbound call platform, said outbound call platform including a plurality of outbound agent workstations, said inbound call platform including a plurality of inbound agent workstations, and wherein said outbound call platform and said inbound call platform are connected by way of at least one communication path, said system comprising:

means for placing at least one outbound telephone call to a called party from said outbound call platform;

means for connecting said outbound telephone call to an available outbound agent at one of said outbound agent workstations, wherein said available outbound agent determines that said called party needs to be handled by an inbound agent in said inbound call platform;

means for transferring said outbound telephone call to a reserved extension on said inbound call platform over said at least one communication path;

means for assigning a call identifier to said outbound telephone call when said outbound telephone call arrives at said inbound call platform;

means for connecting said outbound telephone call to an available inbound agent at one of said inbound agent workstations in said inbound call platform;

means for correlating called party data to said outbound telephone call using said call identifier; and means for transferring said called party data to said one of said inbound agent workstations.

7. The system of claim 6 further including means for transferring said outbound telephone call to an inbound queue.

8. The system of claim 6 further including a controlling device connected to said inbound call platform and to said outbound call platform by way of computer telephony integration (CTI) links, wherein said controlling device instructs said outbound call platform to transfer said outbound telephone call to said reserved extension on said inbound call platform.

9. The system of claim 8 wherein said controlling device correlates said called party data to said outbound telephone call using said call identifier.

10. An call center comprising:

an outbound call platform including:
a dialer for placing outbound telephone calls to called parties; and a plurality of outbound agent workstations, coupled to said dialer, for use by a plurality of outbound agents, wherein said outbound call platform connects said outbound telephone calls to available outbound agents at said plurality of outbound agent workstations; an inbound call platform including:

an automatic call distributor (ACD) handling inbound telephone calls; and a plurality of inbound agent workstations, coupled to said ACD, for use by a plurality of inbound agents, wherein said inbound telephone calls are connected to available inbound agents at said inbound agent workstations;

at least one communication path connecting said outbound call platform and said inbound call platform; and a controlling device coupled to said outbound call platform and to said inbound call platform device by way of computer telephony integration (CTI) links, wherein said controlling device instructs said outbound call platform to initiate a call on said at least one communication path to a reserved extension on said inbound call platform and instructs said outbound call platform to connect one of said outbound telephone calls to said at least one communication path such that a called party on said one of said outbound telephone calls is transferred to one of said inbound agents, and wherein said controlling device correlates called party data pertaining to said called party with said one of said outbound telephone calls transferred to said one of said inbound agents.

11. The call center of claim 10 wherein said inbound call platform assigns a call identifier to said one of said outbound telephone calls when said outbound telephone call arrives at said reserved extension on said inbound call platform, and wherein said inbound call platform passes said call identifier to said controlling device for use in correlating said called party data.

12. The call center of claim 10 wherein said inbound call platform includes an ACD queue, and wherein said one of said outbound telephone calls connected to said inbound call platform is transferred to said ACD queue prior to being connected to said one of said inbound agents.

* * * * *